Sept. 6, 1938. O. J. SUNDSTRAND ET AL Re. 20,850

BOOKKEEPING MACHINE

Original Filed Nov. 7, 1929 4 Sheets-Sheet 1

Inventors
OSCAR J. SUNDSTRAND.
WALTER A. ANDERSON.

L. G. Julihn
Attorney

BOOKKEEPING MACHINE

Original Filed Nov. 7, 1929 4 Sheets-Sheet 2

Inventors
OSCAR J. SUNDSTRAND.
WALTER A. ANDERSON.
L. G. Julihn
Attorney

BOOKKEEPING MACHINE
Original Filed Nov. 7, 1929 4 Sheets-Sheet 3
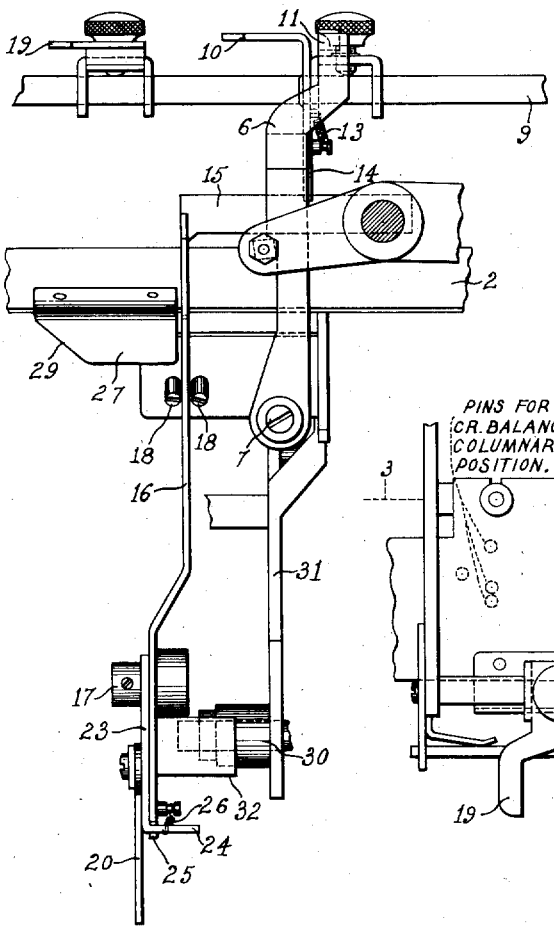
Fig. 3
REAR VIEW
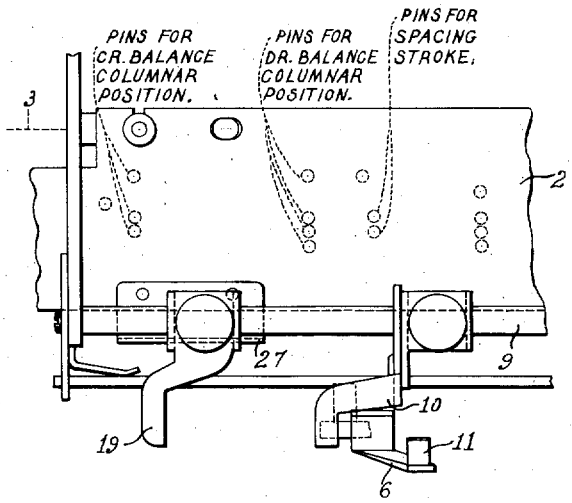
Fig. 4
| OLD BALANCE | CHARGES | CREDITS | DR. BALANCE | CR. BALANCE |
|---|---|---|---|---|
| .00<br>6.75 | 6.75 | 17.00 | 6.75 DR | 10.25 CR |
Fig. 5.
Inventors
OSCAR J. SUNDSTRAND.
WALTER A. ANDERSON.
L. G. Julihn
Attorney Sept. 6, 1938. O. J. SUNDSTRAND ET AL Re. 20,850
BOOKKEEPING MACHINE
Original Filed Nov. 7, 1929 4 Sheets-Sheet 4
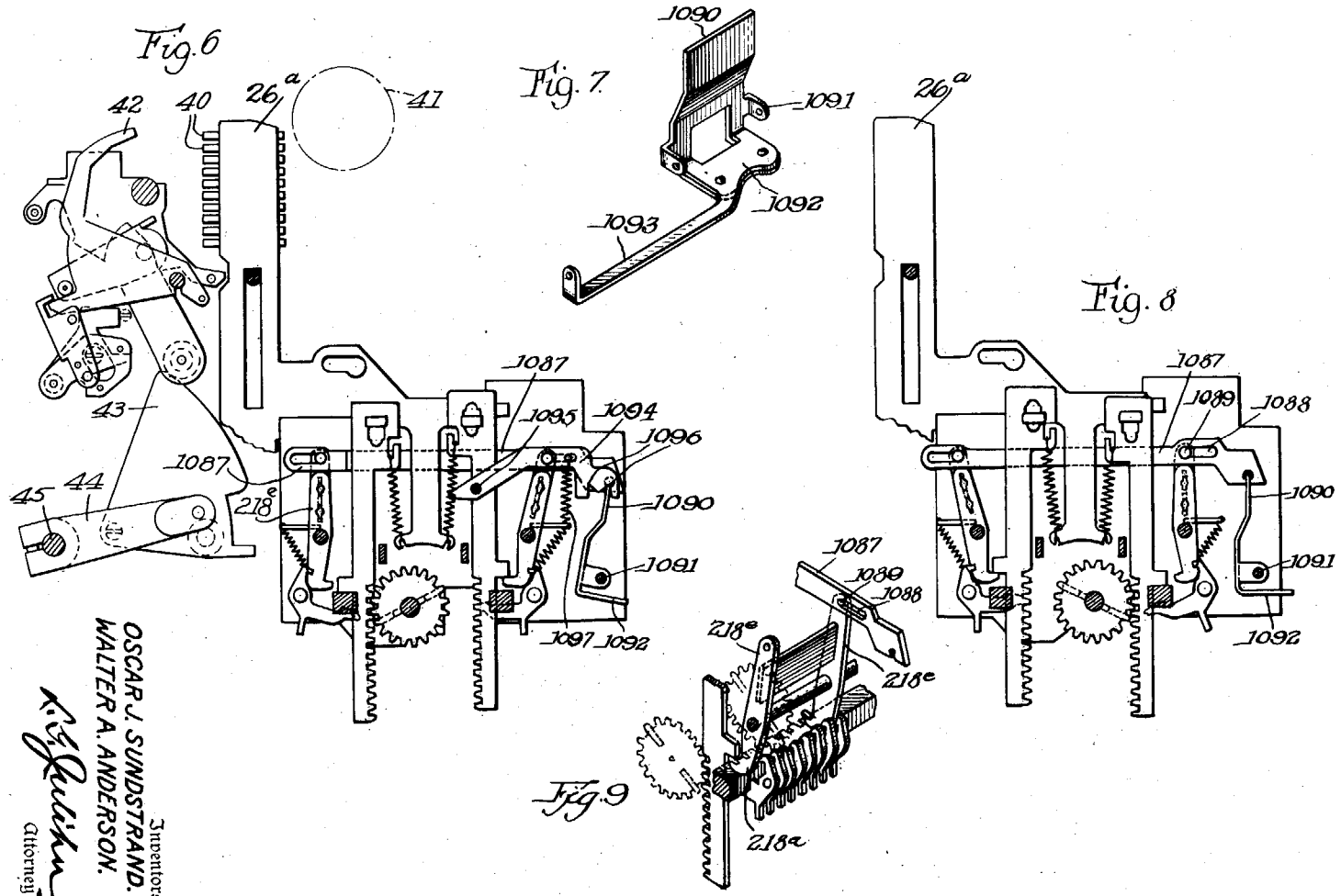
Inventors
OSCAR J. SUNDSTRAND.
WALTER A. ANDERSON.
L. G. Julihn
Attorney Reissued Sept. 6, 1938

Re. 20,850

UNITED STATES PATENT OFFICE 20,850

BOOKKEEPING MACHINE

Oscar J. Sundstrand and Walter A. Anderson, Bridgeport, Conn., assignors to Underwood Elliott Fisher Company, New York, N. Y., a corporation of Delaware Original No. 2,056,747, dated October 6, 1936, Serial No. 405,359, November 7, 1929. Application for reissue November 25, 1936, Serial No. 112,810

26 Claims. (Cl. 235—60)

In certain classes of machine bookkeeping it is desirable that an overdraft be printed in a separate column so that it shall not appear in the same column with the debit balances. One of the objects of this invention is to provide automatically-operated mechanism whereby the machine shall be prevented from printing an overdraft or credit balance in the same column with the debit balances and shall be caused to print credit balances in a special column, the mechanism being so constructed and arranged as to require but little power, and thus causing no interference with the proper functioning of the computing mechanism.

It will be seen that, broadly stated, the object of the invention is to provide means under the control of the totalizer for determining in which columnar position printing shall be done.

The invention may also be viewed as providing means under the control of the totalizer for determining which of two carriage stops shall be effective.

Another object is to cause the motor-driven carriage-returning mechanism to be automatically set in action after the credit balance has been printed in the special credit balance column.

In the accompanying drawings,

Figure 3 is a fragmental rear view of the parts with the carriage in the spacing cycle position.

Figure 4 is a fragmental plan view of the parts in the position shown in Figure 3.

Figure 5 illustrates one form of ledger sheet adapted for use in the machine.

Figure 6 is an elevational view, showing mechanism comprised in the means for controlling operation of the carriage in accordance with the character of the total, and shows parts of the printing mechanism.

Figure 7 is a perspective detail view of a certain element of the means for controlling operation of the carriage in accordance with the character of the total.

Figure 8 is a view generally similar to Figure 6.

Figure 9 is a fragmental perspective view of certain parts utilized in effecting control of carriage operations.

Figure 1:
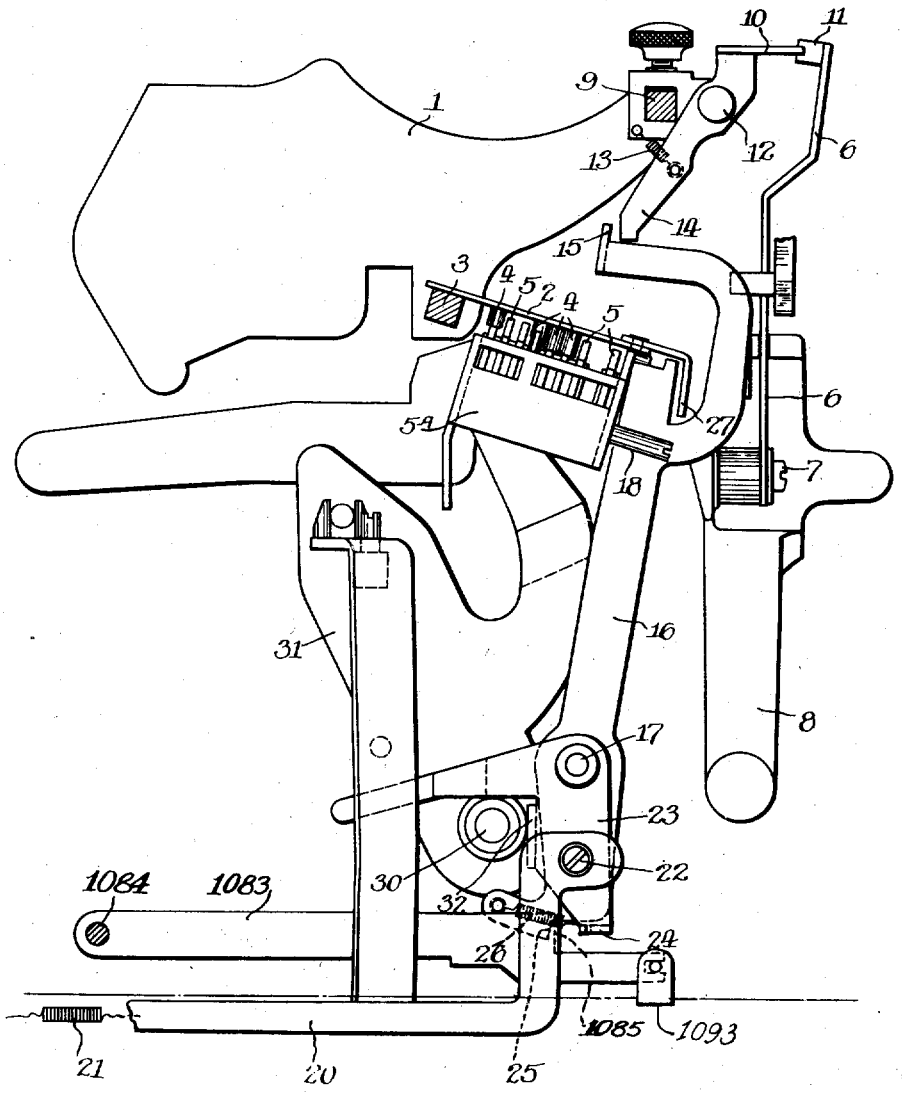
Figure 1 is a fragmental right-hand side elevation of a bookkeeping machine equipped with mechanism embodying the features of the invention. The parts are shown in the position occupied when the machine contains a debit balance.

The invention is herein shown as embodied in a machine generally similar to those disclosed in United States Patents Nos. 1,901,135, 1,965,611, and 2,088,982.

On the laterally movable paper carriage 1 is a control plate 2 which is pivoted to swing on the axis 3, said plate serving to control the paper carriage and certain mechanisms of the machine during the leftward or working stroke of the carriage. On the lower side of the control plate are pins 4 which are arranged to coact with an escapement stop, one or more escapement dogs and a plurality of slides arranged to control certain functions of the machine. These slides, stop and dogs are designated 5 in the drawings. They are arranged in a compact group in a housing 5a mounted at the rear of the machine adjacent to and below the path of travel of the plate 2.

The means for controlling the automatic return of the paper carriage to its initial position at the right of the machine comprises a latch lever 6 pivoted at 7 upon a bracket 8. On the paper carriage is a longitudinally extending bar 9. After the machine is cycled, and printing is completed in the debit balance column position (normally the last columnar position), the carriage is automatically released for a slight additional movement to the left, whereupon a dog 10, adjustably mounted on the bar 9, engages a projection 11, on the upper end of the latch lever 6, and swings said lever toward the left of the operator, to engage the carriage return mechanism, as fully described in Patent No. 1,901,135.

In order that the carriage may travel past the debit balance, or normal last columnar position when the balance is of a credit nature or overdraft, there is provided means whereby the dog 10 is withdrawn from position to engage the lug 11. The dog 10 is pivoted at 12 (Figure 1) and is yieldingly held in its normal position by means of a contractile spring 13. The arm 14 of the dog 10 is arranged to be engaged by a lug 15 which extends parallel with the direction of movement of the carriage 1 (see Figure 3) and which is formed on the upper end of a lever 16 that is pivoted in the machine frame on the axis 17. The lever 16 is confined against lateral displacement by means of guide studs 18. On the bar 9 is a dog 19 (Figures 3 and 4) located nearer the extreme right-hand end of the carriage than the dog 10, in a position corresponding with an "abnormal last column". The dog 19 is adapted to engage the lug 11 and thus initiate the return movement of the carriage when the dog 10 is not in position to engage said lug. The lever 16 is arranged to be automatically operated by the credit-total mechanism.

When there is a credit or negative total or overdraft in the totalizer and the credit total or overdraft is to be printed, means similar to that disclosed in Patent No. 2,088,982 comes into play. Said means includes a link 20 pivoted at 22 to an arm 23 which is pivoted on the axis 17. A spring diagrammatically indicated at 21 in Figures 1 and 2, tends to pull the link 20 forward and thus place the computing mechanism in condition for the printing of an overdraft. On the lower end of the arm 23 is a horizontal lug 24 which is arranged to bear against a shoulder 25 on the lower end of the lever 16. A contractile spring 26 anchored to the lower end of the lever 16 and to the lug 24 tends to hold the lug and the shoulder in contact with each other. Means are provided to restrain the spring 21, and thereby prevent actuation of the lever 16, and consequent tripping of the arm 14, when there is a positive total in the totalizer.

For the purpose of facilitating reference to Patent No. 2,088,982, in which the means to defeat operation of the spring 21, as well as the related operations of the machine, are fully disclosed, recourse will be had to the same numerals therein employed to identify corresponding elements of the machine.

Figure 2:
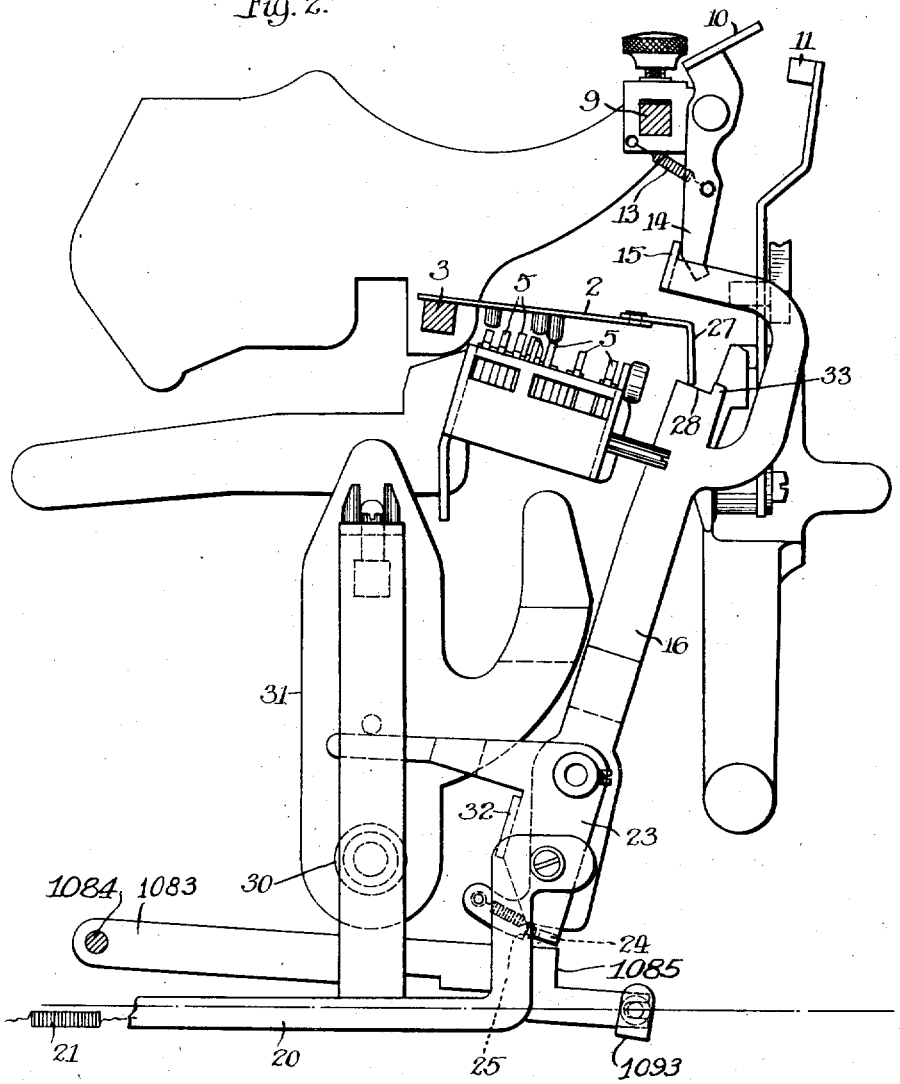
Figure 2 is a similar view, but showing the parts in the position occupied when the machine contains a credit balance and is skipping the debit balance position.

Referring now to Figures 1 and 2:

A stop arm 1083, pivoted in the machine frame at 1084, has a shoulder 1085, which is movable into and out of blocking position in front of the lug 24 on arm 23. The position of stop arm 1083 and hence of shoulder 1085, is dependent upon the character of the total accumulated in the totalizer. Thus when there is a positive total in the totalizer arm 1083 occupies its upper, or blocking position (Figure 1), and is moved to its lower and ineffective position, (Figure 2), when the total in the crossfooter is negative in character.

Referring now to Figures 6, 7, 8 and 9:

Motion is transmitted from the members **218*e* to the stop arm 1083 by means of a link 1087 having elongated openings 1088 to receive headed studs 1089 on the members 218*e*. The rear end of the link 1087 is pivotally connected to an arm 1090 which is pivoted at 1091 in the machine frame. Rigid with the arm 1090 is an arm 1092 to which is fixed a bar 1093 that is pivoted to the rear end of the stop arm 1083 (see Figure 1). The stop arm 1083 is yieldingly held in adjusted position by means of a latch 1094 (Figure 6) which is pivoted at 1095 in the machine frame and which has two notches 1096 in either one of which the upper edge of the arm 1090 is adapted to lie. A contractile spring 1097 keeps the latch 1094 pressed against the arm 1090**.

When the forward pawl **218*e* is tripped to introduce a unit into the totalizer at the time the latter passes from the positive to the negative condition, the link 1087 is pushed rearwardly, (the stud and slot connection preventing interference with the rear pawl 218*e*), thereby lowering the stop arm 1083 and thus leaving the spring 21 (numbered 1078 in said Patent No. 2,088,982) free to function at the proper time in the cycle. If addition subsequently occurs and the totalizer passes from the negative to the positive condition, the rear pawl 218*e* will be tripped to introduce a unit, thereby pushing the link 1087 forward and thus raising the stop arm 1083 into position to restrain the spring 21**.

The printing mechanism may be of any preferred construction. Herein such mechanism is represented by the type bars **26*a*** (Figures 6 and 8).

When there is an overdraft in the machine and the overdraft is to be printed, the spring 21 draws the link 20 forward, thereby swinging the arm 23 forward and thus causing the lug 24 to swing the lever 16 into the position shown in Figure 2. The dog 10 is thereby moved into the position shown in Figure 2, wherein it is out of the path of movement of the lug 11. Hence the carriage return mechanism is not thrown into operation upon the arrival of the paper carriage at the debit balance columnar position, the carriage continuing to move toward the left until the credit balance column on the ledger sheet is in printing position. The machine then performs a cycle of operations to print the overdraft in the credit balance column on the ledger sheet, at the conclusion of which the paper carriage is released by the escapement mechanism for a further slight movement toward the left. Such further movement serves to bring the dog 19 into engagement with the lug 11, whereupon the carriage return mechanism is thrown into operation to cause the carriage to travel toward the right, i. e., toward its initial position.

In order that the paper carriage shall not pause in the debit balance columnar position and print the overdraft in the debit balance column, there is provided means to hold the control plate 2 elevated so that the row of pins 4 corresponding to the debit balance column shall pass idly over the control devices 5. Secured to the rear edge of the control plate 2 is a downwardly extending plate 27. As usual, the machine is arranged to go through a so-called "spacing stroke" or blank cycle of operations prior to the cycle of operations that causes printing of a balance in the debit balance column. During the spacing stroke the control plate 2 is tilted upwardly. If there be an overdraft in the machine the lever 16 will be in the position shown in Figure 2 before the control plate 2 drops after having been raised during the spacing stroke; consequently, in the ensuing movement of the paper carriage the descent of the control plate will be checked due to the fact that the lower edge of the plate 27 comes to rest on the shoulder 28 of the lever 16. Said shoulder serves to hold the control plate 2 elevated until after the pins corresponding to the debit balance columnar position have passed the control devices 5, after which the continuing travel of the paper carriage carries the plate 27 off the shoulder 28, the beveled surface 29 (Figure 3) sliding off the shoulder. Thus the machine is prevented from printing an overdraft in the debit balance column, the carriage continuing to move toward the left until the pins corresponding to the credit balance columnar position stop against the control devices 5, whereupon the machine is actuated to print the overdraft in the credit balance column.

At the end of each cycle of operations of the machine, a stud 30 on an oscillatory arm 31 engages a lug 32 on the arm 23 and restores said arm to its normal position. To prevent such restoration of the arm 23 from causing withdrawal of the shoulder 28 from under the plate 27 until after the plate 27 has traveled off the shoulder 28, the lever 16 has a lug 33 which by contact with the plate 27 prevents the shoulder 28 from swinging out from under the plate 27 until after the latter has passed the shoulder 28. The yieldable connection between the lever 16 and the arm 23 formed by the spring 26 allows the arm 23 to be pushed back to its normal position by the stud 30, even though the lever 16 be obstructed by the plate 27 or the rear wall of the housing 5a.

In Figure 6 type bar 26a is shown supporting printing type 40, adapted to print on paper supported on a roller platen 41. The printing is effected by type hammers such as 42, there being one for each denominational order. Suitable springs impel the hammers against the type for the printing blow, the parts being restored by a cam 43 operated by an arm 44 secured to a main operating shaft 45. The operation of this printing mechanism is similar to that disclosed in Patent No. 1,965,611, to which reference may be made for further details of its operation.

The operation may be summarized as follows:

Figures 1, 3 and 4 show the machine at rest with the paper carriage at the columnar position for taking a spacing stroke. There is a debit balance in the totalizer, as indicated by the position of the stop arm 1083. When the machine is cycled, the carriage moves to the right (Figures 3 and 4), the lower edge of plate 27 passing behind the upper end of lever 16, and the carriage coming to rest in the next (debit balance) columnar position. When the machine is again cycled, the debit balance of 6.75 is printed in the debit balance column, as shown in Figure 5, and the carriage escapes to the right, as viewed in Figures 3 and 4, the dog 10 engaging the lug 11 and causing the carriage-return mechanism to function to return the carriage to the old balance columnar position. There the old balance of 6.75 is set up by means of the keyboard, and the machine cycled to add and print that amount. The carriage then escapes to the credits columnar position, where a credit of 17.00 is set up and the machine cycled to subtract and print said amount. The totalizer now contains a credit balance of 10.25 and the stop arm 1083 is automatically lowered to the position shown in Figure 2. In the cycling of the machine, the carriage escapes to the spacing stroke position shown in Figures 3 and 4. The machine is then cycled to condition it for the taking of the total. In such cycling, the roller stud 30 moves forward, allowing the spring 21 to draw the arm 23 forward and the upper arm of the lever 16 rearward, thus lifting the dog 10 out of the path of the lug 11. This occurs during the forward stroke or first half of the spacing stroke cycle. During the return stroke or second half of that cycle the stop plate 2 is swung up to permit the carriage to escape, the tabulating movement of the carriage causing the plate 27 to ride on the surface 28 of the lever 16 so as to hold the stop plate elevated until after the carriage has passed the debit balance columnar position. The stop plate then drops in time to arrest the carriage in the credit balance columnar position. There the machine is cycled to print the credit balance of 10.25. In the latter part of that cycle the carriage escapes, thus bringing the dog 19 into engagement with the lug 11, and thereby throwing the carriage return mechanism into action.

It will be seen that we have provided means under the control of the totalizer for determining whether the carriage shall skip a column (herein, the debit balance or normally last column). It will also be noted that one spacing stroke position serves for either of two total positions.

While the invention has been shown as embodied in a Sundstrand machine, it will be understood that the invention is not limited to machines of that type. Furthermore, it will be apparent that the invention is capable of numerous applications to machines in which it is desired that the totalizer shall exercise control of the operation of some other component element of the machine, as in this specific instance, the paper carriage.

What is claimed is:

1. In a bookkeeping machine adapted to print in two total columns, the combination of a laterally movable paper carriage, a control plate pivoted to the carriage, control means on said plate, control devices on the machine to coact with said control means on the plate, a carriage return latch lever, a dog on the carriage for operating said latch lever to effect return of the carriage after printing in one total column, a second dog on the carriage for operating the latch lever to cause return of the carriage after printing in the second total column, means including a lever for withdrawing the first dog from operative position when there is an overdraft in the machine, and means on the last mentioned lever for holding the control plate elevated while the carriage is passing the first total column position.

2. In a bookkeeping machine adapted to print in two total columns, the combination of a laterally movable paper carriage, control means on the carriage, control devices on the machine to coact with said control means on the carriage, a carriage return latch lever, a dog on the carriage for operating said latch lever to effect return of the carriage after printing in one total column, a second dog on the carriage for operating the latch lever to cause return of the carriage after printing in the second total column, means including a lever for withdrawing the first dog from operative position when there is an overdraft in the machine, and means on the last mentioned lever for disabling the control means on the carriage while the carriage is passing the first total column position.

3. In a bookkeeping machine, the combination of a laterally movable paper carriage, control means on the carriage, control devices on the machine to coact with said control means on the carriage, a carriage return latch lever, a dog on the carriage for operating said latch lever to effect return of the carriage after printing in a certain column, a second dog on the carriage for operating the latch lever to cause return of the carriage after printing in another column, means for withdrawing the first dog from operative position, and means for disabling the control means on the carriage while the carriage is passing the first mentioned column position.

4. A bookkeeping machine having, in combination, a laterally movable paper carriage, a control plate pivoted to the carriage, control means on said plate, control devices on the machine to coact with said control means on the plate, a downwardly extending plate on the free edge of the control plate, a member to support the second-mentioned plate and thus hold the control plate elevated in inoperative position, credit total mechanism for automatically operating said member, and interengaging guide means for preventing disengagement of said plate and member until the plate has passed off said member in the travel of the carriage.

5. A bookkeeping machine having, in combination, a laterally movable paper carriage, a carriage return latch lever, a pivoted dog on the carriage, said dog being normally in position to operate said latch lever, a second dog on the carriage for operating the latch lever, a lever having a portion extending along and adjacent to the path of travel of the first dog, and credit total mechanism for swinging said lever to withdraw the first dog from operative position.

6. A bookkeeping machine having, in combination, a laterally movable paper carriage, a carriage return latch lever, two means on the carriage to operate said latch lever, a lever having a portion extending along and adjacent to the path of travel of said means, and credit total mechanism for swinging said lever to withdraw one of said means from operative position.

7. In a bookkeeping machine, the combination of a laterally movable paper carriage, a carriage return latch lever, a dog on the carriage for operating said latch lever to effect return of the carriage after printing in a certain column, a second dog on the carriage for operating the latch lever to cause return of the carriage after printing in another column, and means automatically operable as an incident to the existence of an over-draft in the machine for withdrawing the first dog from operative position.

8. In a machine of the class described, the combination of a laterally shiftable carriage adapted to be advanced step by step in one direction, independent means to initiate return of the carriage from any one of a plurality of progressively advanced positions, and totalizer-controlled mechanism effective to defeat operation of an intermediate one of said independent return means.

9. In a machine of the class described, the combination of a laterally shiftable carriage adapted to be moved step by step in one direction in working strokes, means normally operative to cause return of the carriage from a predetermined advanced position, and totalizer-controlled mechanism effective to disable said return means to permit said carriage to advance to a second predetermined advanced position.

10. In a machine of the class described, the combination of a laterally shiftable carriage adapted to be advanced step by step in one direction, independent means effective to cause return of the carriage from any one of a plurality of progressively advanced positions, a totalizer, and machine-operated mechanism sensitive to the character of the total in the totalizer to defeat operation of an intermediate one of said return means.

11. A bookkeeping machine having, in combination, a totalizer comprising a series of pinions arranged in denominational orders, a carriage arranged for advancing and return excursions of movement, means to arrest advancing movements of the carriage in a series of successively advanced positions, and mechanism controlled by the pinion of highest order for rendering the said means ineffective for arresting the carriage in one of the said positions.

12. A bookkeeping machine having, in combination, a totalizer comprising a series of pinions arranged in denominational orders, a carriage arranged for advancing and retracting excursions of movement, the advancing movement of the carriage being effected in a succession of steps of predetermined length at the conclusion of each of which steps the carriage is arrested, and means controlled by the pinion of highest order to vary the length of one of said steps of movement.

13. A bookkeeping machine having, in combination, a totalizer comprising a plurality of pinions, a carriage arranged for advancing and retracting excursions of movement, the advancing movement of the carriage being effected in a succession of steps of predetermined length at the conclusion of each of which steps the carriage is arrested, and means controlled by one of said pinions to vary the length of one of the successive steps of movement of the carriage.

14. In a bookkeeping machine, in combination, a totalizer, a laterally movable paper carriage, a member controlling the return of the carriage, a plurality of devices on the carriage adapted to coact independently with said member to control the point from which the carriage shall be returned, and mechanism controlled by the totalizer according to the character of the total therein for determining which of said devices shall coact with said member.

15. A bookkeeping machine having, in combination, a cross tabulating carriage adapted to tabulate to a plurality of columnar positions, printing means, a totalizer comprising a series of pinions arranged in denominational orders, and means under control of the pinion of highest order for automatically determining which of two columnar positions will be positioned for printing.

16. A bookkeeping machine having, in combination, a cross tabulating carriage adapted to tabulate to a plurality of columnar positions, printing means, a totalizer comprising a series of pinions arranged in denominational orders, and means under control of the pinion of highest order for automatically predetermining the position of the carriage in which the next succeeding printing operation shall occur.

17. In a bookkeeping machine, in combination, a totalizer, a laterally movable paper carriage, a member controlling the return of the carriage, a plurality of devices on the carriage to coact with said member, and automatic mechanism controlled by said totalizer in accordance with the character of the total therein for determining which of said devices shall operate said member.

18. In a bookkeeping machine, in combination, a machine frame, a totalizer, a laterally movable paper carriage on the machine frame, a member on the machine frame for controlling the return of the carriage, said member being operable by the carriage, and automatic mechanism controlled by said totalizer in accordance with the character of the total therein for governing the operation of said member by the carriage.

19. In a bookkeeping machine, in combination, a totalizer, a laterally movable paper carriage, a member controlling the return of the carriage, two elements on the carriage for operating said member, and automatic mechanism controlled by the totalizer according to the character of the total therein for determining which of said elements shall operate said member.

20. In a bookkeeping machine, in combination, a totalizer, a laterally movable paper carriage, means to return the carriage, and machine-operated mechanism, responsive to the character of the total in said totalizer, to determine the point from which the carriage shall be returned.

21. In a machine of the class described, the combination of a laterally shiftable carriage adapted to be advanced step by step, a plurality of means to initiate return of the carriage in one direction, a member cooperating with one or the other of said means to initiate the return, a totalizer, and totalizer controlled mechanism to determine which of said means will cooperate with said member.

22. In a machine of the class described, the combination of a laterally shiftable carriage adapted to be advanced step by step, means whereby the carriage may be returned in one direction from either of two positions, a totalizer, and totalizer controlled mechanism effective to determine from which of the positions the carriage will be returned.

23. In a machine of the class described, the combination of a laterally shiftable carriage adapted to be advanced step by step, mechanism for returning the carriage in one direction, means for rendering the return mechanism operative at either of two positions, a totalizer, and totalizer controlled mechanism to render one of said means ineffective.

24. In a bookkeeping machine, in combination, a totalizer, a laterally movable paper carriage, a member controlling the return of the carriage, a plurality of devices adapted to coact independently with said member to control the point from which the carriage shall be returned, and mechanism responsive to the character of the total in said totalizer for determining which of said devices shall coact with said member.

25. In a machine of the class described, a totalizer, means for adding and subtracting thereon, means, including overdraft mechanism, for taking a true algebraic total therefrom, means for recording the total in either of two lateral positions on a work sheet, and means, controlled by the overdraft mechanism, for causing the total to be recorded in one lateral position if positive and in the other position if negative.

26. In a machine of the class described, amount retaining mechanism, means for entering amounts therein, means for shifting record material for column spacing, and means controlled by the amount retaining mechanism, according to the character of the total of the amounts, for controlling the operation of the shifting means.

OSCAR J. SUNDSTRAND.
WALTER A. ANDERSON.